(12) United States Patent
Parry (10) Patent No.: US 7,075,668 B2
(45) Date of Patent: Jul. 11, 2006

(54) DIRECT PRINTING FROM INTERNET DATABASE

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 322 days.

(21) Appl. No.: 09/925,649

(22) Filed: Aug. 10, 2001

(65) Prior Publication Data

US 2003/0030834 A1 Feb. 13, 2003

(51) Int. Cl.
*G06F 15/00* (2006.01)

(52) U.S. Cl. ...................... 358/1.14; 358/1.15; 358/407

(58) Field of Classification Search ................ 358/1.12, 358/1.13, 1.14, 1.15, 448, 1.18, 400, 402, 358/407; 707/3, 5, 10
See application file for complete search history.

(56) References Cited

U.S. PATENT DOCUMENTS

| 5,848,413 | A | * | 12/1998 | Wolff | ........................ 358/448 |
| 5,873,077 | A | * | 2/1999 | Kanoh et al. | ................... 707/3 |
| 5,956,487 | A | | 9/1999 | Venkatraman et al. | |
| 6,348,970 | B1 | | 2/2002 | Marx | |
| 6,375,078 | B1 | * | 4/2002 | Russell et al. | ......... 235/472.01 |
| 6,434,561 | B1 | * | 8/2002 | Durst, Jr. et al. | ............. 707/10 |
| 6,507,410 | B1 | * | 1/2003 | Robertson et al. | ......... 358/1.18 |
| 6,437,324 | B1 | * | 3/2003 | Tabata et al. | ............... 715/513 |
| 6,609,843 | B1 | | 8/2003 | Mahoney et al. | |
| 6,738,841 | B1 | | 5/2004 | Wolff | |
| 2002/0131071 | A1 | | 9/2002 | Parry | |
| 2003/0030840 | A1 | | 2/2003 | Parry | |
| 2003/0030841 | A1 | | 2/2003 | Parry | |

* cited by examiner

Primary Examiner—Mark Wallerson (57) ABSTRACT

A printing method, comprising the steps of: receiving data at a printer; detecting a network address in the received data; if a network address is detected, then displaying or sending a message notifying of the network address detection and requesting authorization to access the network address; if authorization to access is received, sending on the Internet or other network an access request for a document to the network address; retrieving the document from the network address; and printing the document.

19 Claims, 4 Drawing Sheets

DIRECT PRINTING FROM INTERNET DATABASE

FIELD OF THE INVENTION

The present invention relates generally to the field of printers, fax machines, and copiers, and more particularly, to such devices which access documents either directly or indirectly from the internet.

SUMMARY OF THE INVENTION

Briefly, the present invention comprises, in one embodiment, a printing method, comprising the steps of: receiving data at a printer;
detecting a network address in the received data; if a network address is detected, then displaying or sending a message notifying of the network address detection and requesting authorization to access the network address; if authorization to access is received, sending on the Internet or other network an access request for a document to the network address; retrieving the document from the network address; and printing the document.

In a further aspect of the present invention, the network address is a URL.

In a further aspect of the present invention, the detecting a network address step comprises detecting a barcode in the received data and translating the barcode to the network address.

In a further aspect of the present invention, if no authorization to access is received, then the untranslated barcode is printed.

In a further aspect of the present invention, if no authorization to access is received, then the network address is printed.

In a further aspect of the present invention, the authorization includes a username or password.

In a further aspect of the present invention, the step is included of automatically sending an authorization/unauthorization for the network access based on a criteria.

In a further aspect of the present invention, the criteria used is whether the network address is among one or more authorized network addresses.

In a further aspect of the present invention, the criteria is whether the printer includes antivirus capability.

In a further aspect of the present invention, the criteria is whether the network address is a secure site.

In a further aspect of the present invention, the receiving data step comprises receiving an e-mail containing the data.

In a further aspect of the present invention, the receiving data step comprises receiving an e-mail with an attachment containing the data.

In a further aspect of the present invention, the translating step comprises translating the barcode to obtain a PIN#; and wherein the sending step includes sending the PIN# with the access request to the network address for determining if the request is authorized.

In a further aspect of the present invention, the detecting a barcode step comprises interpreting a wrapper indicating that wrapped data is a barcode.

In a further aspect of the present invention, the translated barcode includes information on printing the document inside another document; and further comprising the step of printing the document inside the other document in accordance with the printing information upon receipt of the document at the printer.

In a further aspect of the present invention, the step is included of printing the document inside a master document.

In a further aspect of the present invention, the translation step comprises translating the barcode to obtain at least one identifier that designates the type of contents in the document; and determining a location of the document within the master document based on the identifier.

In a further aspect of the present invention, the displaying step comprises providing web content to a user location to display a menu of authorization selections.

In a further embodiment of the present invention, a program product is provided comprising machine readable program code for causing a machine to perform the following method steps: receiving data at a printer; detecting a network address in the received data; if a network address is detected, then displaying or sending a message notifying of the network address detection and requesting authorization to access the network address; if authorization to access is received, sending on the Internet or other network an access request for a document to the network address; retrieving the document from the network address; and printing the document.

DETAILED DESCRIPTION OF THE PREFERRED EMBODIMENTS

Figure 1:
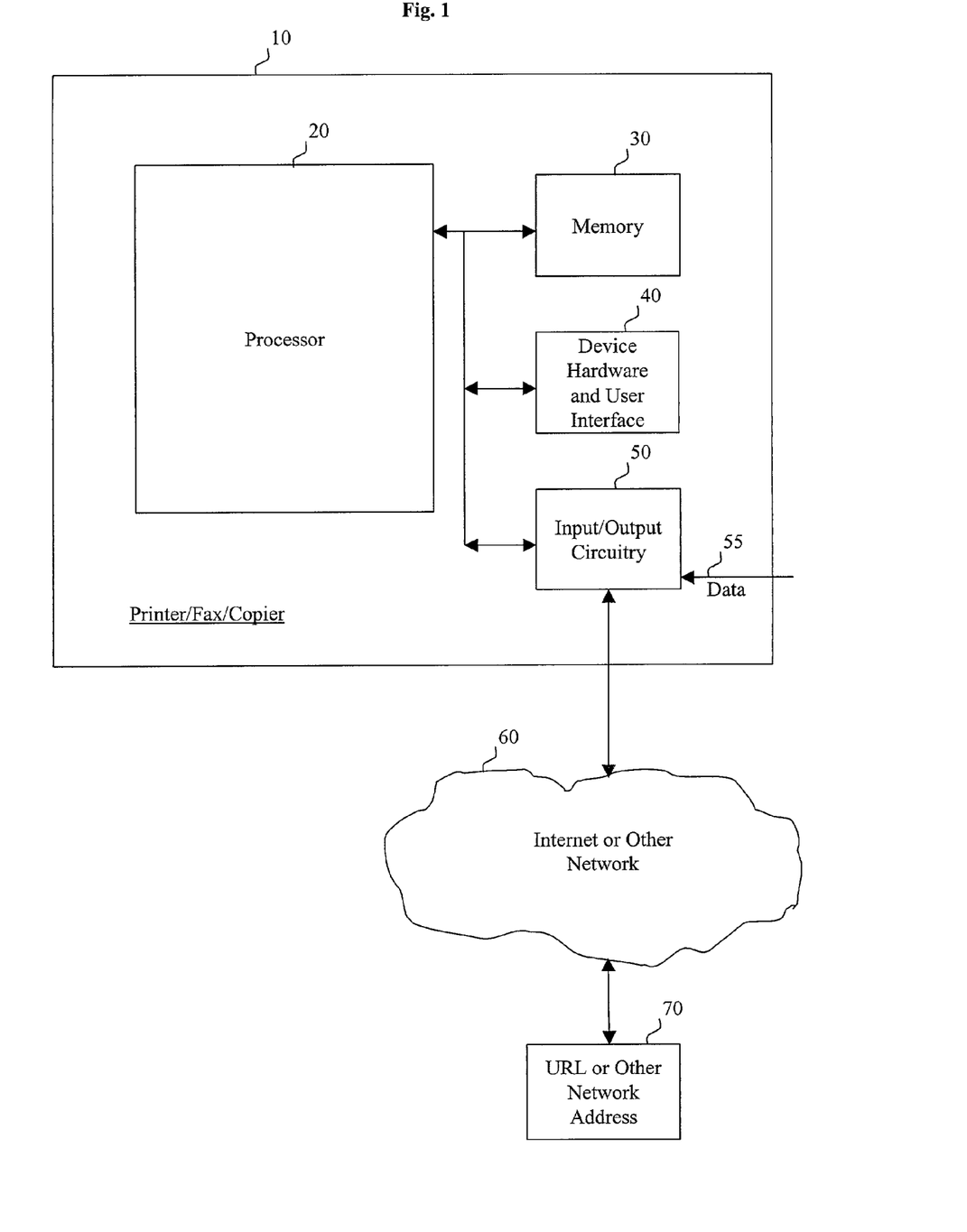
FIG. 1 is a schematic block diagram of an overall system which may be utilized to implement the present invention.

A preferred embodiment of the present invention is implemented utilizing a printer 10. One skilled in the art will recognize that the implementation to be described may also be applied to a facsimile machine or a copier machine. In one embodiment of the implementation of the present invention, the device 10 may include a processor 20, a memory 30, device specific hardware and a user interface 40, and input/output circuitry 50. The processor 20 performs device specific functions for the device 10 in combination with the device specific hardware 40. In the embodiment where the device 10 is a printer, the processor 20 and the memory 30 perform image rendering functions and the device specific hardware 40 includes printer hardware and associated circuitry. The input/output circuitry 50 for such a printer provides network access to the printer device 10. It is preferred that the device specific hardware and user interface 40 include a display screen for providing information and selection options to a user, as well as various buttons and other controls for the user to make selections.

In a preferred embodiment of the present invention, web server functionality is embedded in the printer device 10 by providing software or firmware for the processor 20, by utilizing space available in the memory 30 and by using the existing input/output circuitry 50 such as Ethernet circuitry to transfer HTML files. Implementations of such web access software are widely available in the art. This web access software on the processor 20 would operate to access a URL (Universal Resource Locator) or other external network address at a remote device 70 by means of the internet 60 or other external network. The purpose for this access to the URL at the device 70, which will be explained in more detail below, is to retrieve a document thereat for printing/copying/faxing at the device 10 or another device selected by the user.

In an alternative embodiment, the web server functionality need not be included in the device 10. Rather the input/output circuitry 50 can be connected to a communications network to thereby connect to an internet access device (not shown) for accessing a URL 70 or other external network address via the internet 60. By way of example, this communications network could be a wide area network (WAN), an internetwork, a public telephone network or a private value added network (VAN). Alternatively, the communications network could be implemented using any combination of these different kinds of communications networks. A desired URL would be sent to this internet access device on the communications network to thereby access the web and a document on the URL 70.

Figure 2A:
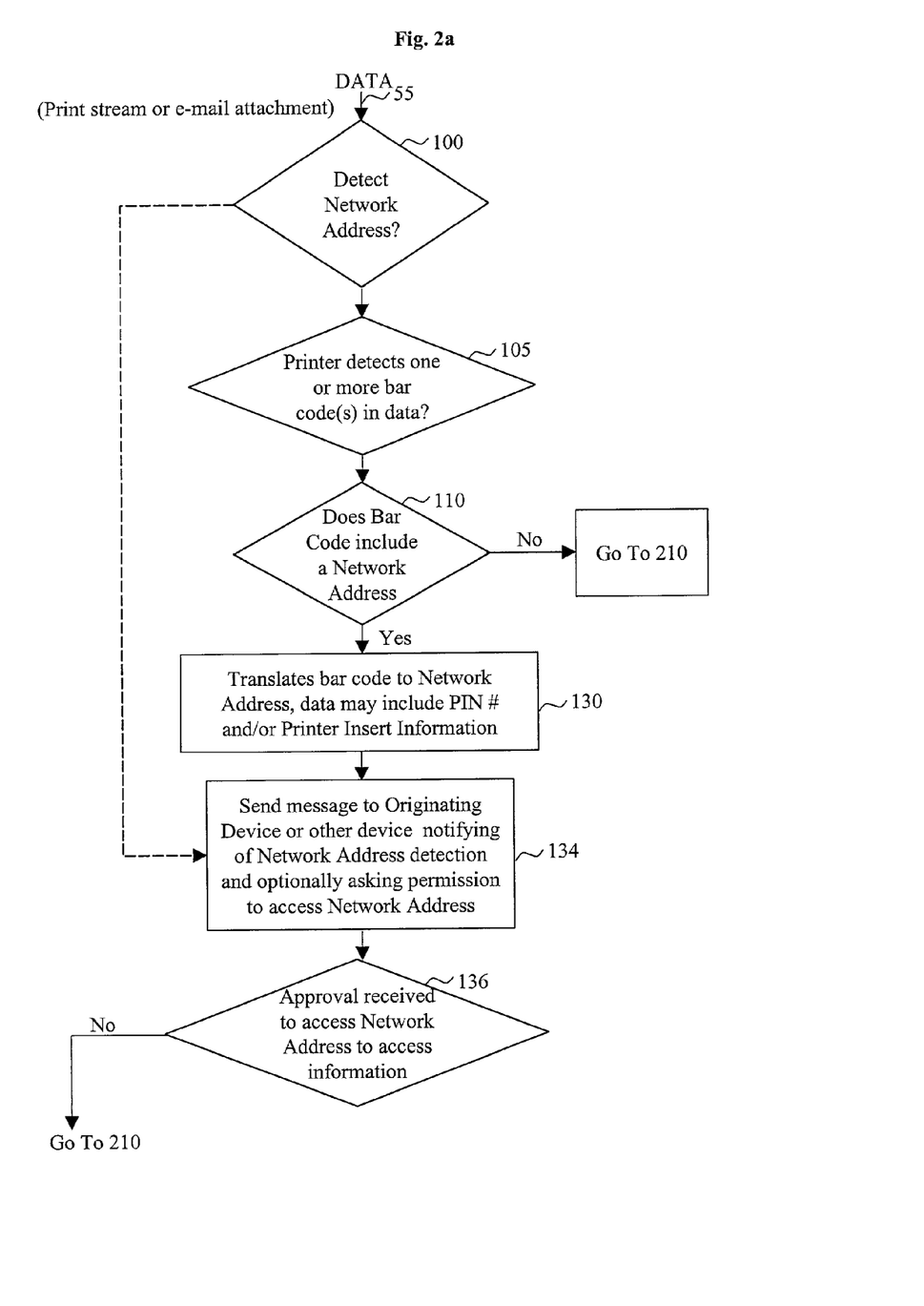
FIGS. 2a and 2b comprise a block diagram flow chart of the method steps and computer program which may be utilized to implement a preferred embodiment of the present invention.
Figure 2B:
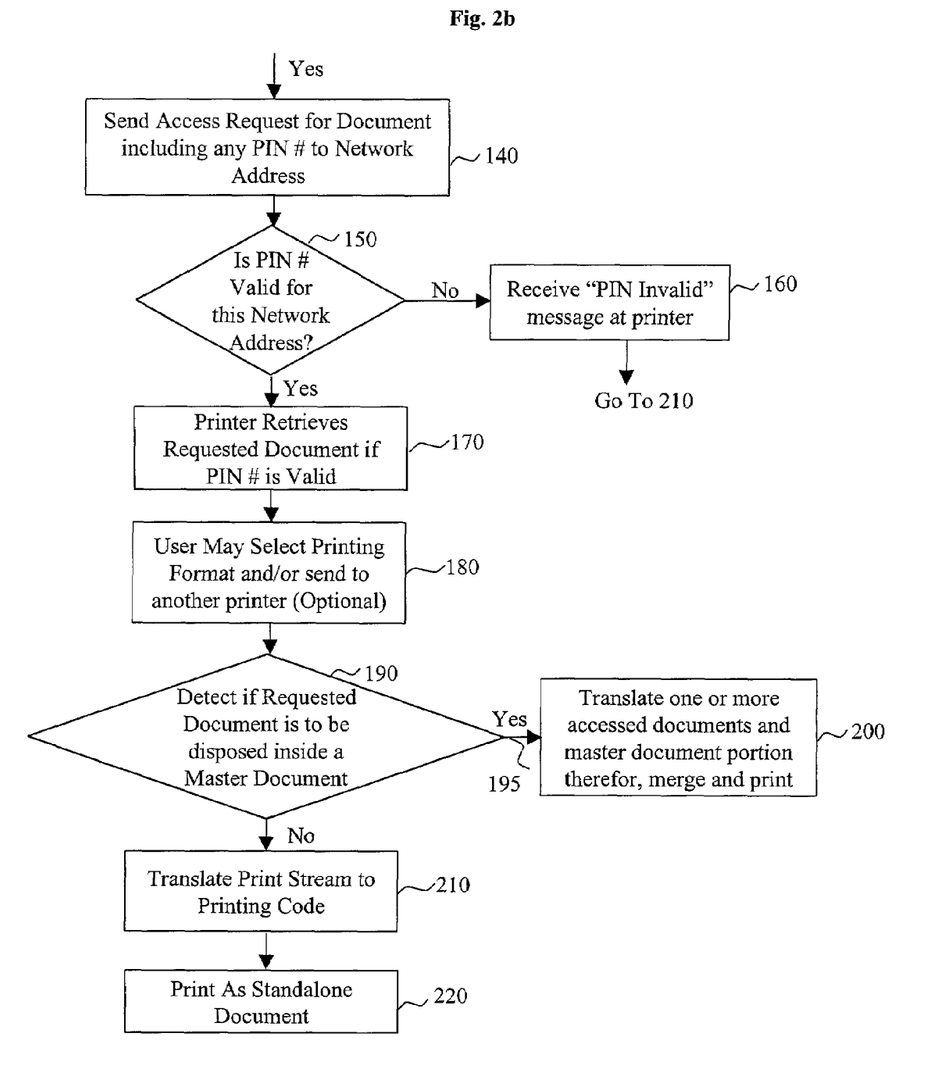

Referring now to FIG. 2, a preferred embodiment of the method and system and program product of the present invention which may be implemented using the structure of FIG. 1 is shown.

As a first step of the method, data is applied on line 55 to the input/output circuitry 50 of the device 10. This is represented in FIG. 2 by the line 55. By way of example, this data could be a print stream. Alternatively, this data could comprise an email, or an attachment to an email, or data that is scanned into the printer system. The first step in the execution, represented by block 100, is for the printer or other device 10 to detect one or more encrypted or non-encrypted network addresses in the data on line 55. By way of example but not be way of limitation, this detection could be accomplished by detecting delimiters at the front and the end of the external network address. Such delimiters could comprise UML tags or PJL commands. In a preferred embodiment, the network address could be a URL or other reference. Additionally, the execution could also detect a pin # and/or a location identifier or a document type identifier to be discussed in more detail below. Such pin # and/or location identifier or document type could be detected in any convenient manner, including through the use of delimiters. In one embodiment, if a network address is detected, then the execution could jump directly to block 134, to be discussed below.

If no network address is detected, or in some embodiments even when a network address is detected, the execution would proceed to block 105 to determine if a barcode is present in the data stream. By way of example, but not by way of limitation, the barcode could be detected by interpreting a wrapper or delimiter that indicates that the wrapped data is a barcode. In one implementation of this embodiment, the block 105 could comprise the printer detecting one or more barcodes in the data stream.

If no URL or other embedded reference is detected in the barcode, then the execution moves to block 210 and the barcode is printed as regular data. If the printer processor 20 detects at least one barcode in the data, then the execution moves to block 110, wherein it is determined whether the barcode includes a URL or other network address reference.

It should be noted that the term URL is used as one example of an implementation of the present invention, and it is understood that the present invention is not limited to only the use of URLs, but may be used to detect and use any convenient network address.

Block 130 translates the barcode to a URL or other reference. In one embodiment, the barcode may additionally include a PIN number which may be used to verify authorization to access the remote URL or other reference. Additionally, the barcode may also include printer insert information if the document to be retrieved from the network address is to be inserted inside a master document. This printer insert information may include, by way of example but not by way of limitation, coordinates within a portion of the master document, such as a page, at which the network document is to be inserted, or other information such as a document type which may be utilized in accordance with a rule to determine where to insert the network document within the master document. For example, a map document at the network address may be designated with the document type "MAP", and inserted to a location in the master document labeled "MAP".

If a network address has been detected in block 100 or if a barcode is determined to include a URL or other network reference and is translated in block 130, then the execution proceeds to block 134, wherein a message is sent to the user, or to a master authorization location, or to some other convenient location, notifying the user or master authorization location or other location of the detection of the URL or other network address. This message would typically include a request for authorization to make access to the site designated by the URL or other network location. By way of example but not by way of limitation, the message could be displayed by sending web content from the printer to the user or other location to display one or more selections relating to authorization. The web content could include a list of authorized web sites or network locations, or could simply provide an AUTHORIZED selection and a NOT AUTHORIZED selection, or any other convenient selection.

The execution then proceeds to block 136, wherein it is determined if authorization has been received from the user or master authorization location or other location. In a preferred embodiment, this block would also determine if a user name or password or other credentials were included in the authorization. Any received user name or password would be compared to one or a set of authorized user names or passwords to determine whether the authorization is proper. Also, in a preferred embodiment, a requirement may be imposed that the authorization be received within a predetermined period of time, or else the system will timeout. This latter requirement could be implemented by including a comparison step wherein the time of receipt of any authorization is compared to a time-out date or time-out time period to determine if the time-out date or time-out time period has been exceeded.

Note the steps 134 and 136 are particularly important to maintain security. In this regard, viruses can be enabled via malicious code on a web site, which code could be caused to execute by accessing the web site. If the address to such a malicious web site were to be contained in a bar code in a stream of printer or other job data, then serious damage could be incurred by the web enabled printer when the web site was accessed and the malicious code executed.

If no authorization is received, or if no authorization is received meeting a predetermined criteria, such as including any required user name or password or other credentials, or being received within a predetermined date or time period, then the execution does not access the URL or other network location, but rather proceeds to block 210 and prints the print stream data with either or without the barcode, or with the translated URL or other external network location, depending on system design choice. Alternatively, the execution could revert back to block 100 to determine if there are any other network addresses or barcodes to process.

Alternatively, if an authorization is received, or if an authorization is received meeting predetermined criteria, if any, then the execution moves to block 140, wherein an access request is generated and sent on the internet 60 or other network to retrieve the document at this URL or network location. As noted above, this access request may include a PIN number.

In block 150 it is determined whether a PIN number, if one is present, is valid for this URL or other network address. If the PIN number is not valid, then the message "PIN Invalid" or other convenient message is received at the printer, per block 160. In a preferred embodiment, the printer or another device could then generate and send a message which could include the identification of the network address, alerting the user or another person that an invalid pin # has been received. Then the execution moves to block 210 and the bar code or network address is printed as regular data in the print stream with other data being printed.

Alternatively, if the PIN number is determined to be valid for the access to the URL or other network address, then the execution moves to block 170, and the printer retrieves the requested document. Optionally, the execution may then move to block 180 wherein the device hardware and user interface 40 displays printing format selection options to a user. Additionally, or alternatively, the option to send this retrieved document to another printer may be provided. For this optional execution block, the user would be given the opportunity by means of various buttons and other appropriate controls to make a selection of the printing format and/or transmission of the document to another printer or other appropriate device. Note that this optional execution block 180 could be located anywhere within the process.

The execution then moves to block 190 wherein it is detected if the requested document is to be disposed inside a master document. If the answer is NO, then the execution moves to block 210 and the retrieved URL document is translated to printing code. Note that the retrieved URL document will include format information for the layout of the document. The execution then moves to block 220 wherein the translated document is printed on the device hardware 40 under the control of the processor 20. The process could then loop back to block 100 and look for additional network addresses and barcodes to process.

Alternatively, if it is determined that the retrieved URL document is to be disposed inside a master document, then the execution moves to block 200. In block 200, one or more retrieved URL documents and a master document portion or the master document in its entirety are translated into a predetermined format, merged and printed.

Figure 3:
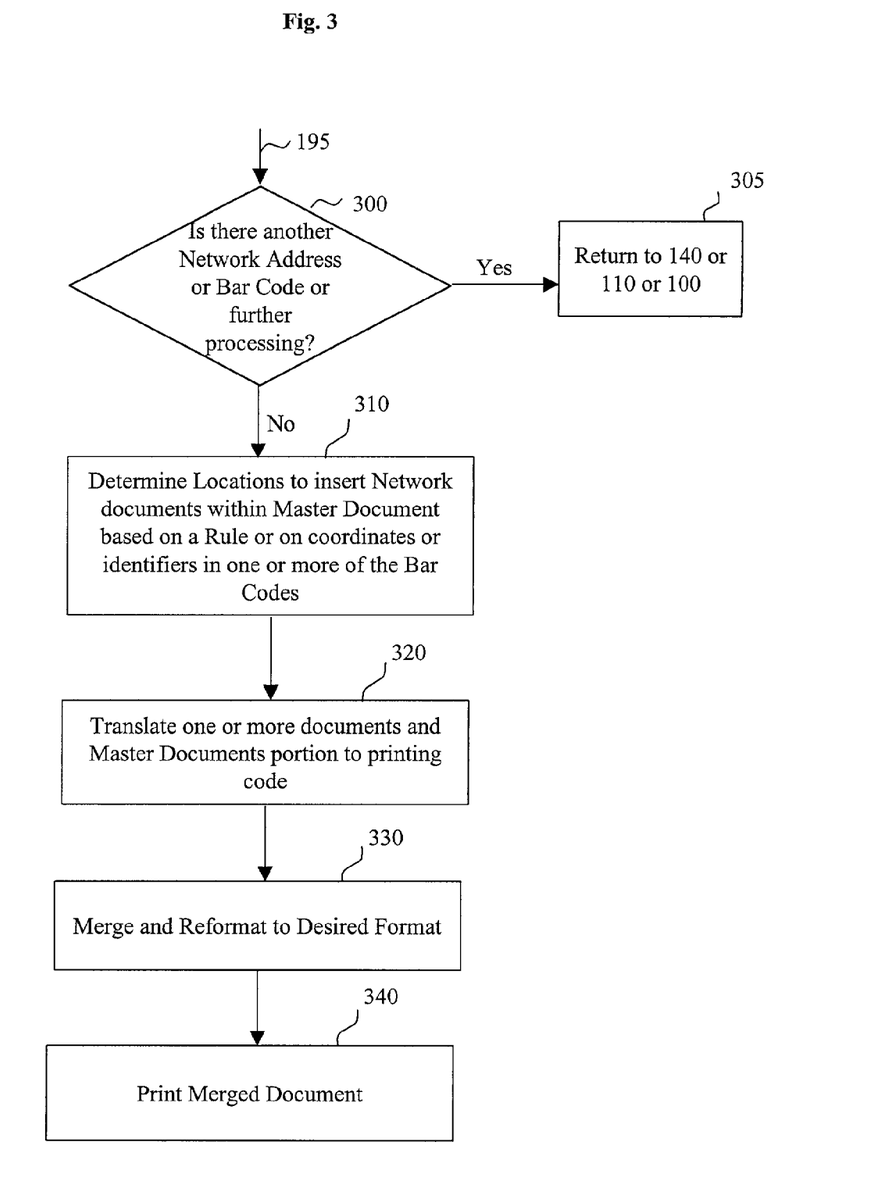
FIG. 3 is a block diagram flow chart providing further details of block 200 in FIG. 2.

Referring now to FIG. 3, additional method and operational details are provided for the execution block 200. Referring to FIG. 3, the retrieved URL document is applied on line 195 to block 300.

In execution of block 300, it is determined whether there is an additional network address or bar code to process. If the entire data stream for the master document or a portion thereof has been already reviewed and all of the network addresses detected or barcodes detected, and if the additional item is a network address, then in block 305 the execution would proceed to block 140 in FIG. 2 and continue the process. Alternatively, if the additional item is a barcode, then the execution proceeds to block 110 and continues the process. Alternatively, if the system did not initially detect all of the network addresses or barcodes on the data stream, then the execution would proceed to 100 and continue the process. Accordingly, additional documents may be retrieved at other network addresses. Multiple different documents at a variety of different remote network addresses may be retrieved in this manner and returned to the device 10. When all of the network addresses and/or barcodes on the master document portion that is to be printed have been translated and the network addresses accessed and the network documents retrieved, then the execution moves to block 310.

It should be noted that depending on the printing software utilized, it may be desirable to perform this process on a page by page basis, or more generally, a portion by portion basis, for the master document. Accordingly, all of the network addresses and barcodes on a particular page that is to be printed are accessed so that those network documents can be merged into that particular master document page. That document page would then be printed, and the printer would then move on to the next page in the master document and search for network addresses and barcodes in the printing data therefore. Alternatively, the printing software may detect all of the network addresses and barcodes in the entire master document and retrieve the documents at various remote network addresses to allow the translation and merger of those network documents with the master documents in one operation. Whether the software utilized operates on a portion by portion basis or retrieves all of the network addresses for the entire master document at one time is a design choice within the skill of the art.

If there are no more network addresses or barcodes to be translated and network documents to be accessed for the portion of the master document to be printed, then the execution moves to block 310 wherein it is determined in which location or locations to insert the network documents within the master document. The locations for insertion of the various retrieved network documents within the master document may be based on coordinates included within each of the network addresses or different barcodes. Alternatively, the locations may be determined in accordance with a rule. By way of example but not by way of limitation, the rule could comprise simply inserting into a set of blocks within the master document the network documents in the order in which the network addresses or barcodes were detected. Alternatively, this rule could comprise using an identifier or tag translated from each of the different network addresses or barcodes to insert the respective document associated with that barcode to a space which is identified by the respective identifier within that document. By way of example, an identifier could identify the document type to be an "EXECUTIVE SUMMARY", and there could be an insert box within the master document which includes an identifier "EXECUTIVE SUMMARY" that matches the identifier.

The execution then moves to block 320 wherein the one or more network documents and the master document portion are translated to printing codes.

The execution then moves to block 330 wherein the one or more network documents and the master document portion are merged and reformatted to a desired format. By way of example but not by way of limitation, a typical format for printing would be PCL or Postscript. The execution then moves to block 340 wherein the merged document portion or the entire document is printed by the device hardware 40.

Note that there may be situations wherein web access capability is not available at the device 10. In this situation where there is no web access capability within the device 10, then after the network address is obtained directly or obtained after translation from a barcode, then the execution moves to a block wherein a search query is sent out on a communications network via the input/output circuitry 50

(FIG. 1) to connect to an internet access device for accessing the web. By way of example, this communications network could simply comprise an intranet and the access could be to a web access software module or to a web server on the intranet. This internet access device would then be utilized to access the network address by means of the internet 60. If the PIN number, if any, is determined to be valid by this URL 70, then the requested document is retrieved back to the internet device, and from that device it is provided to the printer device 10 for printing as described previously for FIG. 2.

It should be noted that the present invention is particularly advantageous for summary reports, wherein various sections of the report are being continuously updated. The present invention, by means of the insertion of one or more network addresses or barcodes within a master document, allows a report to be updated on the fly by accessing a plurality of different URL's or other network addresses which are maintained with up-to-date information. In one aspect, a company could maintain a variety of its documents on the internet but accessible only by means of a PIN number or some other security operation. This invention would allow access to such documents without the need for firewalls. Additionally, the present invention is particularly advantageous in that it provides an accurate rendition of a URL or other network address, via the direct detection of a network address or via a translation of a barcode, without the need for human intervention with the potential for typographical errors. Accordingly, an error free transmission of a document to a printer or other device such as a fax machine or copier, can be accomplished simply by sending an email with one or more barcodes embedded therein.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A printing method, comprising:
   receiving print stream data at a printer;
   detecting, at the printer, a network address in the received print stream data;
   if a network address is detected, then displaying or sending a message from the printer notifying a user entity of the network address detection and requesting authorization from the user entity to access the network address;
   if authorization to access is received from the user entity at the printer, sending on the Internet or other network, an access request for a document to the network address from the Printer;
   retrieving the document from the network address at the printer;
   merging, at the printer, the document from the network address into the print stream data to form a modified document; and
   printing the modified document.
2. The method as defined in claim 1, wherein the network address is a URL.
3. The method as defined in claim 1, wherein the detecting a network address step comprises detecting a barcode in the received data and translating the barcode to the network address.
4. The method as defined in claim 1, wherein, if no authorization to access is received, then printing the untranslated barcode.
5. The method as defined in claim 1, wherein, if no authorization to access is received, then printing the network address.
6. The method as defined in claim 1, wherein the authorization includes a username or password.
7. The method as defined in claim 1, further comprising the step of automatically sending an authorization/unauthorization for the network access based on a criteria.
8. The method as defined in claim 7, wherein the criteria is whether the network address is among one or more authorized network addresses.
9. The method as defined in claim 7, wherein the criteria is whether the printer includes antivirus capability.
10. The method as defined in claim 7, wherein the criteria is whether the network address is a secure site.
11. The method as defined in claim 1, wherein said receiving data step comprises receiving an e-mail containing said data.
12. The method as defined in claim 1, wherein said receiving data step comprises receiving an e-mail with an attachment containing said data.
13. The method as defined in claim 3, wherein said translating step comprises translating the barcode to obtain a PIN#; and wherein said sending step includes sending the PIN# with the access request to the network address for determining if the request is authorized.
14. The method as defined in claim 3, wherein the detecting a barcode step comprises interpreting a wrapper indicating that wrapped data is a barcode.
15. The method as defined in claim 3, wherein the translated barcode includes information on printing the document inside another document; and further comprising the step of printing the document inside the other document in accordance with the printing information upon receipt of the document at the printer.
16. The method as defined in claim 1, further comprising the step of printing the document inside in a master document.
17. The method as defined in claim 3, wherein the translation step comprises:
    translating the barcode to obtain at least one identifier that designates the type of contents in said document; and
    determining a location of the document within the master document based on said identifier.
18. The method as defined in claim 1, wherein the displaying step comprises providing web content to a user location to display a menu of authorization selections.
19. A program product comprising a computer readable medium having machine readable program code for performing the following method steps:
    receiving print stream data at a printer;
    detecting, at the printer, a network address in the received print stream data;
    if a network address is detected, then displaying or sending a message from the printer notifying a user entity of the network address detection and requesting authorization from the user entity to access the network address;

if authorization to access is received from the user entity, sending on the Internet or other network an access request for a document to the network address from the printer;

retrieving the document from the network address at the printer;

merging, at the printer, the document from the network address into the print stream data to form a modified document; and printing the modified document.

* * * * *

UNITED STATES PATENT AND TRADEMARK OFFICE
CERTIFICATE OF CORRECTION

PATENT NO. : 7,075,668 B2 Page 1 of 1
APPLICATION NO. : 09/925649
DATED : July 11, 2006
INVENTOR(S) : Travis J. Parry It is certified that error appears in the above-identified patent and that said Letters Patent is hereby corrected as shown below:

In column 7, line 52, in Claim 1, after "message" insert -- , --.

Signed and Sealed this

Eighteenth Day of August, 2009

David J. Kappos
*Director of the United States Patent and Trademark Office*

UNITED STATES PATENT AND TRADEMARK OFFICE
CERTIFICATE OF CORRECTION

PATENT NO. : 7,075,668 B2 Page 1 of 1
APPLICATION NO. : 09/925649
DATED : July 11, 2006
INVENTOR(S) : Travis J. Parry It is certified that error appears in the above-identified patent and that said Letters Patent is hereby corrected as shown below:

In column 8, line 45, in Claim 16, after "document" delete "inside".

Signed and Sealed this

Twenty-fourth Day of November, 2009

David J. Kappos
*Director of the United States Patent and Trademark Office*